United States Patent
Bottou et al.

(10) Patent No.: US 6,343,154 B1
(45) Date of Patent: *Jan. 29, 2002

(54) COMPRESSION OF PARTIALLY-MASKED IMAGE DATA

(75) Inventors: Leon Bottou, Monmouth, NJ (US); Steven Pigeon, Blainville (CA)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/533,819

(22) Filed: Mar. 24, 2000

Related U.S. Application Data

(62) Division of application No. 09/232,223, filed on Jan. 19, 1999, now Pat. No. 6,058,214.
(60) Provisional application No. 60/071,839, filed on Jan. 20, 1998.

(51) Int. Cl.[7] .................................................. G06K 9/36

(52) U.S. Cl. ........................ 382/240; 382/239; 382/238; 382/248

(58) Field of Search .................................. 382/181, 232, 382/233, 235, 236, 238, 239, 240, 241, 242, 248, 268, 275, 277; 342/192, 197; 704/229, 230; 348/416, 423

(56) References Cited

U.S. PATENT DOCUMENTS

| | | | |
|---|---|---|---|
| 5,563,960 A | 10/1996 | Shapiro | 382/239 |
| 5,764,805 A | 6/1998 | Martucci et al. | 382/238 |
| 5,822,458 A | * 10/1998 | Silverstein et al. | 382/235 |
| 5,845,243 A | 12/1998 | Smart et al. | 704/230 |
| 5,896,176 A | * 4/1999 | Das et al. | 348/416 |

OTHER PUBLICATIONS

Bottou, Leon et al.: *High Quality Document Image Compression with "DjVu"*, Journal of Electronic Imaging, Jul. 1998, vol. 7, No. 3, pp. 417–420.

Santago Pete et al.: *New Solution for Frequency and Pixel Domain Coding Using Convex Sets*, SPIE, Aug. 1985, Applications of Digital Image Processing VIII, vol. 575, pp. 66–70.

Faryar A. Farid et al.: *Transform/Time Coding Domain Using the Method of Projection onto Convex Sets*, Proceedings of the IEEE International Conference on Acoustics, Speech, and Signal Processing, 1985, vol. 1, pp. 351–354.

Antonini, Marc et al.: *Image Coding Using Wavelet Transform*, IEEE Transactions on Image Processing, Apr. 1992, vol. 1, No. 2, pp. 205–220.

Chen, Homer H. Et al.: *A Block Transform Coder for Arbitrarily Shaped Image Segments*, IEEE 1994, AT&T Bell Laboratories, Holmdel, NJ, pp. 85–89.

* cited by examiner

Primary Examiner—Wenpeng Chen

(57) ABSTRACT

Wavelet coding of partially-masked image information may be made faster by either of two embodiments of the present invention. In a first embodiment, quick convergence is obtained by performing wavelet encoding in stages, each stage associated with a predetermined wavelet scale. By advancing the stages from finest scale to coarsest scale, coefficients of masked wavelets are identifies early in the coding process. In a second embodiment, quick convergence is obtained by introducing overshoot techniques when masked coefficients are identified, modified and image data is reconstructed therefrom.

11 Claims, 3 Drawing Sheets

COMPRESSION OF PARTIALLY-MASKED IMAGE DATA

RELATED APPLICATION

This application is a divisional of U.S. patent application Ser. No. 09/232,223, filed Jan. 19, 1999, now U.S. Pat. No. 6,058,214 issued May 2, 2000.

This application benefits from priority of U.S. provisional patent application No. 60/071,839 filed Jan. 20, 1998 the disclosure of which is incorporated herein by reference.

BACKGROUND OF THE INVENTION

Books and magazines often contain pages containing audacious mixtures of color images and text. The present invention relates to a fast and efficient method of coding partially-masked image information of such documents by wavelet coding without wasting bits on the image data that is masked by foreground text.

A simplified block diagram of a wavelet coding system is shown in FIG. 1. The system includes an encoder 100 and a decoder 200. The encoder 100 codes input image information according to wavelet compression techniques and outputs coded image data to a channel 300. The coded image data includes wavelet coefficients representing the image data. The decoder 200 retrieves the coded image data from the channel 300 and decodes-it according to wavelet decompression techniques.

Multi-resolution wavelet decomposition is one of the most efficient schemes for coding color images. These schemes involve several operations: color space transform, image decomposition, coefficient quantization and coefficient coding.

Image information to be coded is represented as a linear combination of locally supported wavelets. An example of wavelet support is shown in FIG. 2(a). Wavelets extend over a predetermined area of image display. For the length of every wavelet such as $W_0$, two other wavelets $W_{1a}$ and $W_{1b}$ extend half of its length. The length of each underlying wavelet $W_{1a}$, $W_{1b}$ is itself supported by two other wavelets $W_{2a}$, $W_{2b}$, $W_{2c}$ and $W_{2d}$. This support structure may continue until a wavelet represents only a single pixel.

Image data may be coded as a linear combination of the wavelets. Consider the image data of FIG. 2(b). As shown in FIG. 2(c), the image data may be considered as a linear combination of the wavelets of FIG. 2(a). To represent the image data, only the coefficients of the wavelets that represent the image data need by coded. The image data of FIG. 2(b) may be coded as:

| $W_0$ | $W_{1a}$ | $W_{1b}$ | $W_{2a}$ | $W_{2b}$ | $W_{2c}$ | $W_{2d}$ | $W_{3a}$ | $W_{3b}$ | $W_{3c}$ | $W_{3d}$ | $W_{3e}$ | $W_{3f}$ | $W_{3g}$ | $W_{3h}$ |
|---|---|---|---|---|---|---|---|---|---|---|---|---|---|---|
| 1 | 0 | 1 | 0 | 0 | 1 | 0 | 0 | 5 | 0 | 0 | 0 | 0 | 3 | 0 |

Because most of the wavelet coefficients are zero, the coefficients themselves may be coded using highly efficient coding methods.

The linear combination of coefficients can be expressed in matrix notation as:

$$Aw = x \quad (1)$$

where w is a vector of wavelet coefficients, x is a vector of pixel values, and A is a square matrix whose columns represent the wavelet basis. Matrix A usually describes an orthogonal or nearly orthogonal transformation. When a decoder 200 is given the wavelet coefficient, then it may generate the image data x using the process of Equation. 1. Efficient multi-scale algorithms perform image decomposition (i.e. computing $A^{-1}x$) and image reconstruction (i.e. computing Aw) in time proportional to the number of pixels in the image.

In practice, most image data is smooth. It differs from the exemplary image data of FIG. 2(b) in that the image data generally does not possess abrupt variations in image value. Whereas the image data used in the example of FIG. 2(b) possesses significant energy in the coefficients of shorter wavelets, natural image data does not often possess energy in these coefficients.

The image local smoothness ensures that the distribution of the wavelet coefficients is sharply concentrated around zero. High compression efficiency is achieved using quantization and coding schemes that take advantage of this peaked distribution.

When a unitary source of information, such as a page of a book or magazine, contains both text and image data, the text may be considered as a "mask" that overlays image data beneath the text. Coding of any part of the image data beneath the masking text becomes unnecessary because the text will mask it from being observed. In the case of wavelet encoding. Masked wavelets need not be coded.

When image data is masked, the mask blocks image data thereunder from being observed. Coding errors that are applied to masked image data are unimportant because the masked image data will be replaced with data from the mask. Also, the mask disrupts the smoothness of the image data. It introduces sharp differences in the value of the image data at the boundaries between the image and the foreground text. Coding of the sharp differences would cause significant energy to be placed in the short wavelet coefficients, which would cause coding inefficiencies to arise in coding the image data. Such coding inefficiencies are particularly undesirable because coding errors that occur below the mask will be unnoticed at the decoder where the mask will overlay the erroneous image data. Accordingly, there is a need in the art for a image coder that codes masked image data efficiently.

SUMMARY OF THE INVENTION

The disadvantage of the prior art are alleviated to a great extent by a successive projections algorithm that codes partially-masked image data with a minimum number of wavelet coefficients. According to the successive projections algorithm unmasked image information is coded by wavelet decomposition. For those wavelets whose energy lies substantially below the mask, the wavelet coefficients are canceled. Image reconstruction is performed based on the remaining coefficients. For the image information that lies outside of the mask, the reconstructed image information is replaced with the original image information. The wavelet coding, coefficient cancellation, and image reconstruction repeats until convergence is reached.

The present invention also provides a simple and direct numerical method for coding the image information in a manner that obtains quick convergence. In a first embodiment, quick convergence is obtained by performing masked wavelet encoding in stages, each stage associated with a predetermined wavelet scale. By advancing the stages from finest scale to coarsest scale, coefficients of masked wavelets are identifies early in the coding process. In a second embodiment, quick convergence is obtained by introducing overshoot techniques to the projections of images.

BRIEF DESCRIPTION OF THE DRAWINGS

FIG. 2(*b*) illustrates image data that may be coded by wavelets.

FIG. 2(*c*) illustrates a linear combination of the wavelets of FIG. 2(*a*) that represents the image data of FIG. 2(*b*).

DETAILED DESCRIPTION

Figure 1:
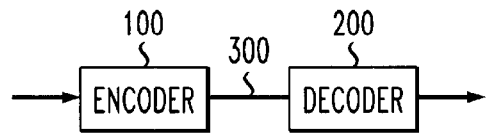
FIG. 1 illustrates a coding system in which wavelet image coding may be applied.
Figure 2A:
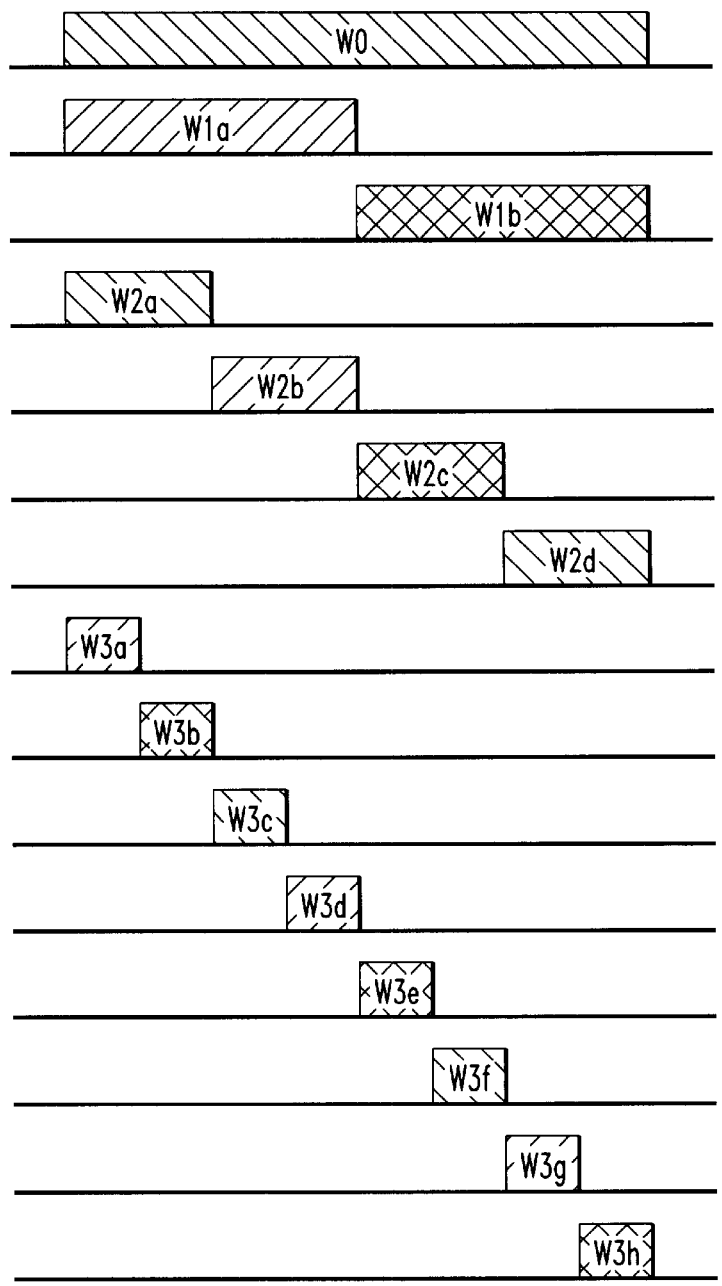
FIG. 2(*a*) illustrates wavelets.
Figure 2B:
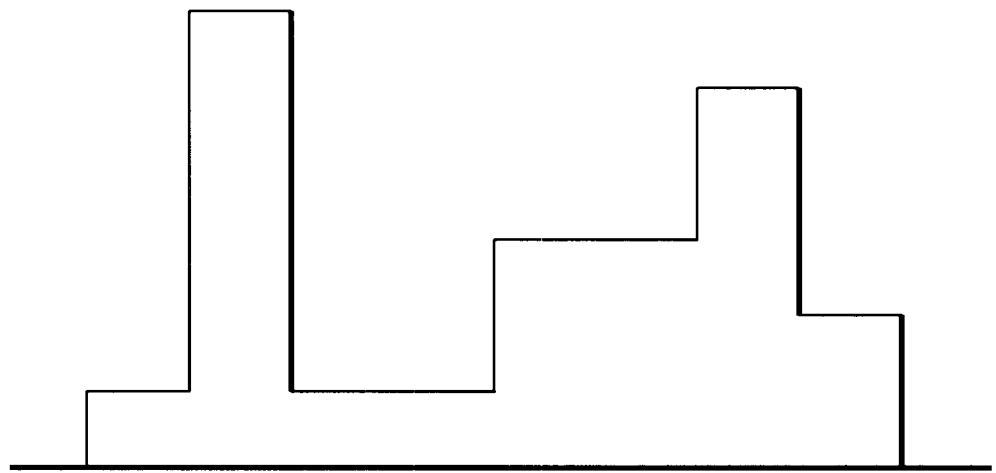
Figure 2C:
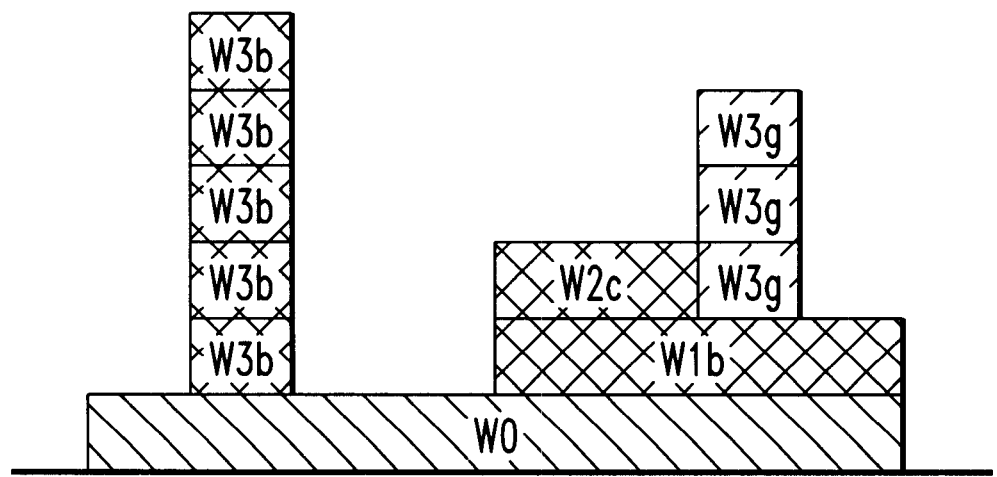

The present invention provides a coding technique adopted to code partially-masked image data with a minimum number of wavelet coefficients. It is called the "Successive Projections Algorithm." The technique replaces masked pixels with a smooth interpolation of non-masked pixels to improve coding efficiencies.

The present invention also proposes two techniques to improve convergence of the success projections algorithm. The first technique, labeled the "Multi-Scale Successive Projections Method," breaks the wavelet decomposition stage of encoding into several stages. In the first stage, wavelet encoding is performed on the smallest wavelets. In each stage thereafter, successively larger wavelets are encoded. Quick convergence is obtained because the smaller wavelets are likely to possess significant energy below the mask. They are identified in the early stages. In the latter stages, many fewer iterations of image reconstruction and coefficient recalculation are needed because the larger wavelets are not likely to posses significant energy below the mask.

The second technique, called the "Overshooting Successive Projections Method," causes projections of images to the sets P and Q to be subject to overshooting. Quick convergence is obtained be requiring fewer iterations of image reconstruction and coefficient recalculation.

Successive Projections

According to the successive projections algorithm, an image is represented as pixels. The visible pixels (i.e. pixels that are not masked) are never affected by the coefficients of wavelets whose support is entirely located below the mask. Therefore, a simple idea for solving the problem consists in either: (a) skipping these coefficient while coding, or (b) setting them to zero, which is the most code-efficient value. The first solution saves a few bits, but requires that the mask be known during decoding. The second solution does not suffer from this constraint; the compressed image file can be decoded according to normal wavelet techniques regardless of the mask.

Most of the information about masked background pixels is carried by wavelets whose support is partially-masked only. Canceling the coefficient of a partially-masked wavelet changes the visible pixels located outside the mask. The coefficient of other wavelets must be adjusted to compensate for this effect. The adjusted coefficients represent an image whose visible pixels exactly match the corresponding pixels of the target image. The masked pixels however can be different. Their value is simply a code-efficient interpolation of the visible pixels.

Reordering the pixel vector x and the wavelet coefficient vector w allows a block-decomposition of equation (1):

$$Aw = \begin{pmatrix} B & C \\ D & E \end{pmatrix} \cdot \begin{pmatrix} w' \\ w'' \end{pmatrix} = \begin{pmatrix} x' \\ x'' \end{pmatrix} = x \quad (2)$$

where x" represents the masked pixels, x' represents the visible pixels, w" represents the wavelet coefficients to be canceled, and w' represents the remaining wavelet coefficients. The algorithm seeks adjusted wavelet coefficients that solve:

$$Bw'=x'$$
$$w''=0 \quad (3)$$

Equation (3) has solutions if the rank of the rectangular matrix B is equal to the number of remaining, non-canceled wavelet coefficients. The rank condition, however, implies that the number of canceled wavelet coefficients must be smaller than the number of masked pixels.

Given a mask and a wavelet decomposition, canceled wavelet coefficients (called the "masked coefficients") must be chosen. The choice of the masked coefficients impacts the resulting file size. Canceling a wavelet whose energy is significantly located outside the mask requires a lot of adjustments on the remaining coefficients. These adjustments are likely to use coefficients that would be null otherwise. Empirically, good results are achieved by canceling wavelet coefficients when at least half of the wavelets energy is located below the mask.

Once the set of masked coefficients is selected, equation (3) may be solved. There are many techniques for solving sparse linear systems. There is however a method which relies only on the efficient wavelet decomposition and reconstruction algorithms.

Every image can be represented in pixel coordinates (i.e. a collection of pixel values) or in wavelet coordinates (i.e. a collection of wavelet coefficients). The coordinate transformation is described by matrix A. The solutions belong to the intersection of the following sets of images:

The set P of all images whose pixels located outside the mask are equal to the corresponding pixels in the image being compressed. This set is a closed convex affine subspace of the image space.

The set Q of all images whose wavelet representation contains zeroes for all masked coefficients. This set also is a closed convex affine subspace of the image space.

Figure 3:
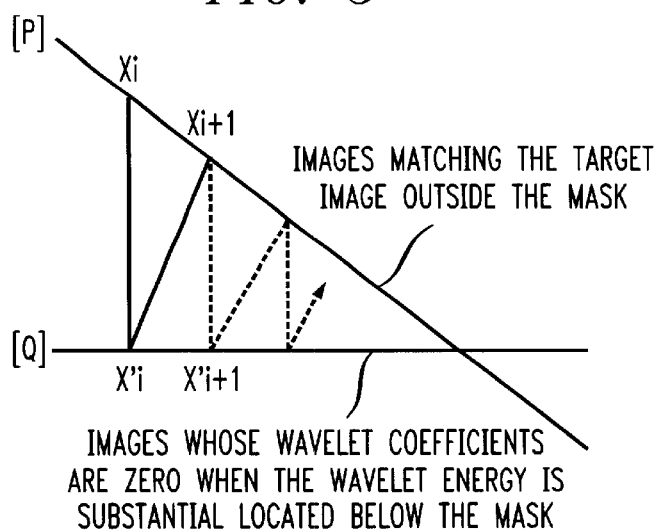
FIG. 3 is a graph illustrating convergence of classic wavelet encoders that code partially-masked image information.

Let P (respectively Q) be the projection operator on set P (respectively Q). The initial image $x_0$ already is an element of set P. As shown in FIG. 3, the image is projected successively upon sets Q and P:

$$x'_i = Qx_i \in Q \quad (4)$$
$$x_{i+1} = Px'_i = PQx_i \in P$$

This sequence is known to converge toward a point in the intersection of convex sets P and Q provided that the intersection is not empty. The simplest version of the successive projections algorithm consists of the following steps:

i) Initialize a buffer with the pixel values of the initial image.
ii) Perform the wavelet decomposition.
iii) Set all masked wavelet coefficients to zero (projection Q).
iv) Perform the image reconstruction.
v) Reset all visible pixels to their value in the initial image (projection P).
vi) Loop to step (ii) until convergence is reached.

Convergence may be monitored by measuring the distance between the visible pixels of the initial image and the corresponding pixels of the image reconstructed in step (iv).

Convergence Speed

This section presents a bound on the convergence speed and a criterion on the existence of a solution. The bound depends only on the set of masked pixels and the set of masked coefficients. It therefore is a useful element for selecting the masked coefficients.

Since $x_{i+1} = Q(x_{i+1})$ is the orthogonal projection of $x_{i+1}$ on Q, we have (cf. FIG. 3):

$$\|x_{i+1} - x'_i\|^2 = \|x_{i+1} - x'_{i+1}\|^2 + \|x'_{i+1} - x'_i\|^2 \geq \|x_{i+1} - x'_{i+1}\|^2 \quad (5)$$

The contraction ratio therefore is bounded by:

$$\frac{\|x_{i+1} - x'_{i+1}\|^2}{\|x_i - x'_i\|^2} \geq \frac{\|x_{i+1} - x'_i\|^2}{\|x_i - x'_i\|^2} \quad (6)$$

Vector $x_i - "_i = x_i - Q(x_i)$ belongs the linear subspace orthogonal to Q. It can be written as a linear combination of the wavelets $e_j$ corresponding the masked coefficients resulting in:

$$x_i - x'_i = \sum_j \alpha_j e_j \quad (8)$$

$$x_{i+1} - x'_i = x_i - x'_i - P(x_i - x'_i) = \sum_j \alpha_j (e_j - P(e_j)) \quad (7)$$

Vector $e_j - P(e_j)$ represents the part of wavelet $e_j$ which is not located below the mask. These clipped wavelets are completely defined by the mask and by the set of masked coefficients. Combining results (6), (7) and (8) provides a bound λ on the contraction ratio. This bound depends only on the set of masked pixels and the set of masked coefficients.

$$\frac{\|x_{i+1} - x'_{i+1}\|^2}{\|x_i - x'_i\|^2} \leq \sup_{\|\sum_j \alpha_j e_j\|=1} \left\|\sum_j \alpha_j(e_j - P(e_j))\right\| = \lambda \quad (9)$$

The right-hand side of inequality (9) easily is interpreted. Adding a unit vector to the masked coefficients causes a perturbation on the visible pixels. The norm of this perturbation is less than lambda. Quantity λ naturally depends on the energy and shape of the part of the masked wavelets that overlaps the visible pixels.

An argument similar to equation (5) ensures that $\|x_{i+1} - x_i\| \leq \|x_i - x'_i\|$. This result and inequality (9) provide bounds on the convergence speed:

$$\|x_{i+1} - x_i\| \leq \|x_i - x'_i\| \leq \lambda^i \|x_0 - x'_0\| \quad (1)$$

Condition λ<1 therefore is a sufficient condition for ensuring that both sequences $(x_i) \in P$ and $(x'_i) \in Q$ converge geometrically to a same point x*. The limit x* belongs to both P and Q because these sets are closed sets.

This result defines a remarkably fast convergence. The successive projection method reaches a solution with a predetermined accuracy after a number of iterations proportional to the logarithm of the number $N_m$ of masked pixels only, as shown by equation (10) and the following bound:

$$\|x_0 - x'_0\| \leq \|x_0 - x^*\| + \|x'_0 - x^*\| \leq 2\|x_0 - x^*\| \leq 2\sqrt{N_m}$$

As a comparison, solving equation (3) with a typical sparse linear system technique, like the conjugate gradients method, would require a number of iterations proportional to the number $N_v$ of visible pixels.

Thus, the iterative nature of the successive projections algorithm requires repetitive calculation of wavelet coefficients, reconstruction of image data and re-calculation of wavelet coefficients. It introduces undesired delay to image data encoding. Any technique that improves convergence of the successive projections algorithm improves performance of the wavelet encoder. It would reduce the cost of wavelet encoding. accordingly, there is a need in the art for a fast and efficient method of coding partially-masked image data by wavelet coding techniques.

Multi-scale Successive Projections

The multi-scale nature of the wavelet decomposition algorithm provides a way to improve the value of λ and therefore improve the convergence speed.

Developing the norm of the pixel perturbation term in inequality (9) shows how quantity λ depends on the shapes and the scales of the set of masked wavelets:

$$\left\|\sum_j \alpha_j(e_j - P(e_j))\right\|^2 = \sum_j \alpha_j^2 \|e_j - P(e_j)\|^2 + \quad (11)$$

$$\sum_{j \neq k} \alpha_j \alpha_k (e_j - P(e_j)) \cdot (e_k - P(e_k)) \quad (12)$$

The first terms of the sum (11) depends on the norm of the clipped wavelets $e_j - P(e_j)$. Since the wavelets $e_j$ are normalized, and since only those wavelets whose support is substantially masked are canceled, the norm of the clipped wavelets is a small number (typically smaller than ½). The second term (12) depend on the overlaps between clipped wavelets. Clipped wavelets of similar scale (i.e. wavelets whose support has identical size) are not likely generate much overlap, because they are designed to cover the pixel space efficiently. Large scale wavelets, however, overlap many small scale wavelets. These overlaps drive up the value of λ.

Figure 4:
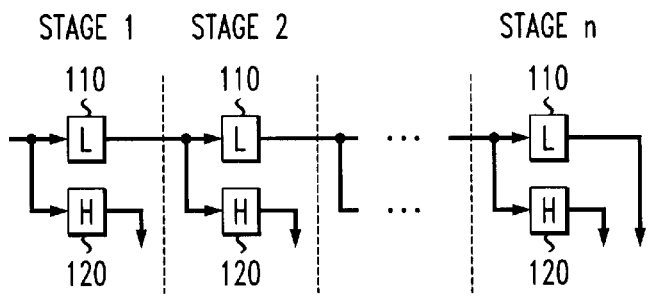
FIG. 4 is a block diagram of a wavelet encoder adapted for use with the present invention.

Multi-scale wavelet decomposition algorithms factor the decomposition (i.e. multiplying the image pixel by matrix $A^{-1}$) into a sequence of identical stages (see FIG. 4). Each stage consists of a low-pass linear filter 110 and a high-pass linear filter 120 applied to the input image. The low pass filter 110 returns a half resolution image which is provided as input to the next stage. The high-pass filter 120 returns all the coefficients of wavelets of a particular scale. The input image of each stage can be reconstructed by combining the output of both filters 110 and 120.

Since all the wavelets coefficients for the finest scale are produced by the first stage, all masked coefficients for this scale may be canceled using the successive projections algorithm above with a one stage decomposition only. This operation outputs a half-resolution image and a first set of coefficients fulfilling the masking conditions. The visible pixels of the initial image can be reconstructed by combining these outputs with the usual algorithms. The wavelet coefficients for the coarser scales are processed by repeating the operation for each successive stage in the wavelet transform. In other words, the multi-scale successive projections algorithm consists of the following operations:

i) Initialize the current image with the pixels of the image being compressed. Initialize the current mask with the set of pixels that will be masked by foreground objects.

ii) Apply the successive projections algorithm on the current image, using a one-stage wavelet decomposition only.

iii) Set the current image to the half resolution image returned by the low-pass wavelet filter. Set the current mask to a half resolution mask in which a pixel is masked if the corresponding pixels in the previous mask were masked.

iv) Loop to step (ii) until all stage of the multi-scale wavelet decomposition has been processed.

This method has been found to run one order of magnitude faster on realistic images than the simple successive projections algorithms above. This improvement is explained by the smaller values of $\lambda$ and by the lower complexity of the projection operations (each stage of the algorithm processes an image whose size is half the size of the previous image).

Overshooting

Figure 5:
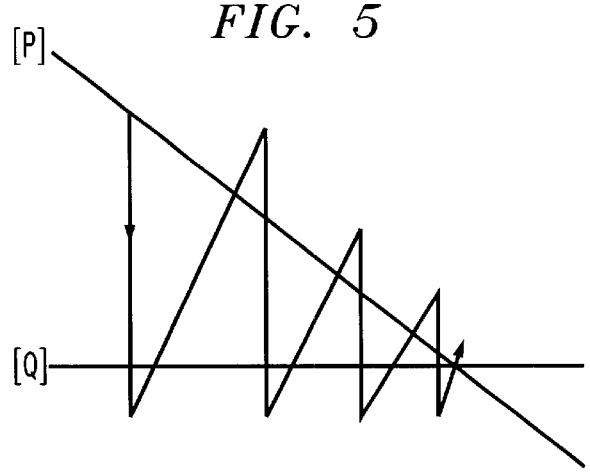
FIG. 5 is a graph illustrating convergence of the wavelet encoder of the present invention.

Another speedup can be obtained by applying an overshooting technique applied for successive projections onto convex sets. Instead of successive projections, the overshooting technique uses the following sequences (See, FIG. 5):

$$x'_i = x_i + \gamma(Q(x_i) - x_i)$$

$$x_{i+1} = x'_i + \gamma(P(x'_i) - x'_i) \quad (13)$$

where $0 < \gamma < 2$. Choosing $\gamma = 1$ gives the successive projections algorithms as above. However, in high dimension spaces, choosing a higher value of $\gamma$ may lead to faster convergence. In our implementation, choosing $\gamma = 3/2$ in the multi-scale successive projections approximation has divided the convergence time by three.

The wavelet masking technique described herein significantly reduces an amount of coded image data necessary to represent partially-masked images. It can handle arbitrarily complex masks with reasonable computational requirements. There is no need to generate a wavelet basis having a support restricted to the visible pixels.

The wavelet masking techniques, however, converge much faster than the straightforward iterative processing techniques. Therefore, latency in coding of image data is reduced over the prior art.

The coding techniques described wherein provide an efficient coding technique for partially-masked image data. There is no requirement, however, that the image data be masked before it is input to the encoder. The encoder requires only a definition of image data outside the mask and a definition of the mask itself. The encoder operates with the same efficiency data when the image data under the mask has been masked or is left unaltered.

We claim:

1. A method of coding an image that includes a background image and a foreground image occupying respective image areas, comprising:

coding the background image as a plurality of image coefficients;

canceling any image coefficients associated with spatial areas occupied by the foreground image reconstructing image data in both image areas from remaining coefficients;

substituting background image data for the reconstructed image data in the background image area—and coding new image coefficients from the reconstructed image data.

2. The method of claim 1, wherein the plurality of image coefficients are wavelet coefficients.

3. A method of coding partially-masked image data, comprising:

receiving original image data to be coded;

recursivelycoding the image databy:

generating wavelet coefficients representing the image data to be coded, canceling coefficients of masked wavelets, reconstructing image data from the remaining coefficients, correcting the reconstructed image data with the original image data in un-masked image areas, the corrected reconstructed data to be used as image data to be coded in a subsequent iteration, and outputting the wavelet coefficients of a final iteration as a coded data signal.

4. The method of claim 3, wherein masked wavelets are those having a substantial portion of their energy located below a mask.

5. A method of coding partially-masked image data, comprising:

coding the image data as transform coefficients in a plurality of stages, performed from the finest scale to coarsest scale, wherein at least one stage of coding comprises:

setting the resolution of the image data to the scale of the instant stage, generating transform coefficients representative of the unmasked image data, the transform coefficients associated with the scale of the instant stage, canceling transform coefficients associated with a spatial area that coincides with a mask, reconstructing image data based on the remaining coefficients, for any portion of the reconstructed image data located outside of the mask, substituting the corresponding original image data therefor, and repeating the generating, canceling and reconstructing steps at least once unless the reconstructed image data outside of the mask converges to the corresponding original image data.

6. The method of claim 5, wherein the transform coefficients are wavelet coefficients obtained by wavelet coding.

7. The method of claim 6, wherein the canceled coefficients include clipped wavelets having a substantial portion of their energy below the mask.

8. The method of claim 5, wherein the setting step includes low pass filtering the image data.

9. A method of coding partially-masked image data, comprising for at least one iteration:

coding the image data as transform coefficients, for each coefficient w corresponding to image data coincident with a mask, modifying the coefficient by a transform $w'=w(1-\gamma)$, where $\gamma$ is an overshoot factor having a value from 0 to 2;

reconstructing image data from the modified transform coefficients and the unaltered transform coefficients;

for any portion of the reconstructed image data $x'_i$ that differs from a corresponding portion of the image data $x_i$, resetting the reconstructed image data to $x'_i=(1+\gamma)x_i$.

10. The method of claim 9, wherein the transform coefficients are wavelet coefficients obtained by wavelet coding.

11. The method of claim 10, wherein the coefficients w include clipped wavelets having a substantial portion of their energy below the mask.

* * * * *